(12) United States Patent
Brouhon et al.

(10) Patent No.: US 6,962,450 B2
(45) Date of Patent: Nov. 8, 2005

(54) METHODS AND APPARATUS FOR GENERATING IMAGES

(75) Inventors: Patrick Brouhon, Saint Martin d'Uriage (FR); Ira Goldstein, Concord, MA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 10/661,000

(22) Filed: Sep. 10, 2003

(65) Prior Publication Data

US 2005/0053405 A1 Mar. 10, 2005

(Under 37 CFR 1.47)

(51) Int. Cl.[7] .................................................. B41J 11/44
(52) U.S. Cl. ........................ 400/76; 400/74; 178/18.01; 235/494
(58) Field of Search ............................... 400/61, 62, 65, 400/70, 72, 73, 76, 88; 178/18.01–18.03, 18.09, 19.01, 19.05; 235/380, 435, 454–456, 460, 462.08, 462.09, 487, 494; 345/156–158, 162–166, 173–180; 382/100, 112, 134, 168, 141–143, 181–184, 188–190, 280, 286, 290, 299

(56) References Cited

U.S. PATENT DOCUMENTS

| | | | |
|---|---|---|---|
| 5,337,361 A | | 8/1994 | Wang et al. .................. 350/51 |
| 5,841,978 A | | 11/1998 | Rhoads .................. 395/200.47 |
| 5,852,434 A | * | 12/1998 | Sekendur ..................... 345/179 |
| 6,098,882 A | | 8/2000 | Antognini et al. .......... 235/454 |
| 6,164,847 A | * | 12/2000 | Allen ........................... 400/74 |
| 6,502,756 B1 | * | 1/2003 | Fåhraeus .................... 235/494 |
| 6,586,688 B2 | * | 7/2003 | Wiebe ..................... 178/18.09 |
| 6,674,427 B1 | * | 1/2004 | Pettersson et al. .......... 345/179 |
| 6,689,966 B2 | * | 2/2004 | Wiebe ..................... 178/18.01 |
| 2002/0150276 A1 | | 10/2002 | Chang ......................... 382/100 |
| 2002/0186884 A1 | | 12/2002 | Shaked et al. .............. 382/183 |
| 2003/0012455 A1 | | 1/2003 | Olsson eta l. ............... 382/286 |

FOREIGN PATENT DOCUMENTS

| | | |
|---|---|---|
| WO | 00/73983 A1 | 12/2000 |
| WO | 01/26033 A1 | 4/2001 |
| WO | 01/71643 A1 | 9/2001 |
| WO | 01/75773 A1 | 10/2001 |
| WO | 01/75783 A1 | 10/2001 |
| WO | 02/082366 A1 | 10/2002 |

OTHER PUBLICATIONS

U.S. Appl. No. 10/660,323, filed Sep. 10, 2003, Nelson.
U.S. Appl. No. 10/660,324, filed Sep. 10, 2003, Nelson et al.
U.S. Appl. No. 10/661,001, filed Sep. 10, 2003, Mackenzie et al.
Anoto Home Page Internet:: <<http://www.anoto.com>> pp. 1–2 (Jan. 19, 2004).
"The Technologies Behind Anoto Functionality" Internet: <<http://web.archive.org/web/20030622071228/www.ano-to.com/?url;=/technology/1 page total (Jan. 19, 2004).
"Construction" Internet: <<http://web.archive.org/web/20030623220554/www/anoto.com/?url=/technology/pat-ter . . . 1 page total (Jan. 19, 2004).
"How does it work?" Internet: <<http://www.anotofunction-ality.com/navigate.asp?PageID=24>> 1 page total (Jan. 19, 2004).
"Anoto Pattern & Digital Paper" Internet: <<http://www.an-otofunctionality.com/navigate.asp?PageID=73>> 1 page total (Jan. 19, 2004).

* cited by examiner

Primary Examiner—Minh Chau (57) ABSTRACT

A method of generating an image comprising a position identifying pattern and a content feature comprises the steps of: generating the pattern and the content feature each as a plurality of graphical elements, and superimposing the content feature and the pattern. The content elements are smaller than the pattern elements in at least one dimension.

53 Claims, 7 Drawing Sheets

METHODS AND APPARATUS FOR GENERATING IMAGES

CROSS REFERENCE TO RELATED APPLICATIONS

This application is related to the following Patent Applications: U.S. patent application Ser. No. 10/661001 filed Sep. 10, 2003, entitled "Printing Digital Documents"; U.S. patent application Ser No. 10/660324 filed Sep. 10, 2003, entitled "Location Patterns And Methods And Apparatus For Generating Such Patterns"; U.S. patent application Ser. No. 10/660324 filed Sep. 10, 2003, also entitled "Location Patterns And Methods And Apparatus For Generating Such Patterns"; British Patent Application No. GB20030021164 filed Sep. 10, 2003, entitled "Methods, apparatus and software for printing location pattern" and, British Patent Application No. GB20030021168 filed Sep. 10, 2003, entitled "Printing of documents with position identification pattern".

FIELD OF THE INVENTION

The present invention relates to methods and apparatus for generating position identifying pattern, which can be detected by a suitable detection system. The pattern may be applied to a product such as a document, which may be a form, label or note pad, or any other form of product suitable for such marking, such as a packaging product.

BACKGROUND TO THE INVENTION

It is known to use documents having such position identification pattern in combination with a pen having an imaging system, such as an infra red sensitive camera, within it, which is arranged to image a small area of the page close to the pen nib. The pen includes a processor having image processing capabilities and a memory and is triggered by a force sensor in the nib to record images from the camera as the pen is moved across the document. From these images the pen can determine the position of any marks made on the document by the pen. The pen markings can be stored directly as graphic images, which can then be stored and displayed in combination with other markings on the document. In some applications the simple recognition that a mark has been made by the pen on a predefined area of the document can be recorded, and this information used in any suitable way. This allows, for example, forms with check boxes on to be provided and the marking of the check boxes with the pen detected. In further applications the pen markings are analysed using character recognition tools and stored digitally as text. Systems using this technology are available from Anoto AB and described on their website www.Anoto.com.

In order to allow documents to be produced easily with the position identifying pattern on them, it is desirable for the pattern to be suitable for printing on the types of printer that are readily available to a large number of users, such as an ink jet, laser jet or LEP printer. These are digital printers and typically have a resolution of 300, 600 or 1200 dots per inch, and the accuracy with which each dot can be located is variable. Also such printers are generally either monochrome, or, if they are colour printers, have only a small number of ink colours. Therefore, if it is desired to print position coding pattern on a part of a product which has human visible content on it as well, it can be a problem to ensure that the position identifying pattern can be distinguished from the content by the reading device, and that the content remains clearly visible to the human eye, and distinguishable over the content.

SUMMARY OF THE INVENTION

According to a first as aspect of the invention there is provided a method of generating an image comprising a position identifying pattern and a content feature, the method comprising the steps of: generating the pattern and the content feature each as a plurality of graphical elements, and superimposing the content feature and the pattern, wherein the content elements are smaller than the pattern elements in at least one dimension. This can enable the pattern elements within the superimposed area to be machine read, for example by a digital pen.

The step of generating the content feature may comprise the steps of: defining the content feature, determining whether the content feature is to be superimposed on the pattern and, if it is, converting the content feature so that it comprises said content elements. This ensures that substantially any content feature can be printed with the pattern. Clearly some initial content features will be modified more than others in the conversion process to enable them to be distinguished from the pattern. Content features which are already formed from a number of graphical elements may simply require changes to the size or spacing of those elements. Content features which are initially solid colour, for example solid black, will need to be broken down into separate graphical content elements.

The method may comprise, before the converting step, determining whether the content feature already comprises said content elements and, only if it does not, performing the converting step. This allows features which are already in a form which can be superimposed on the pattern, without preventing the pattern from being read, to be printed in their original form without undergoing any further modification.

The content marks may be smaller in two dimensions, which may be orthogonal dimensions, than the pattern marks, and may each be smaller in area than the pattern marks.

The difference in size between the pattern elements and the content elements, which is required to enable the pattern to be machine read, will depend on the details of the reading device. If the reading device is arranged to recognize marks in a predetermined range of sizes as being pattern elements, then the content elements need to be of a size that is well outside that range to ensure that the reading device does not erroneously identify the content elements as pattern elements. For example the content elements may be no bigger than half as big, in said one dimension, as the pattern elements. Where the content elements comprise discrete dots, they may be, on average, no bigger than a third, or even a quarter, of the area of the pattern elements.

When applied to a product the pattern elements may each be formed from a plurality of dots or pixels merged together to form a substantially solid mark, and the content elements may each be formed from at least one dot or pixel. This is how the product can be printed on a printer, such as an inkjet, laser jet or LEP printer. Such printers apply ink or toner in a large number of discrete areas, or pixels, which are the smallest areas that the printer can mark individually. The content elements may therefore each comprise a single pixel, thereby being as small as the printer can make them. Alternatively they may each be made up of a plurality of pixels merged together into a single mark.

The pattern and the content may be printed substantially simultaneously in a one-pass printing process, i.e. on a single pass of a carrier through the printer. This allows the product, which may be a document, label, packaging article, or any other printed product, to be printed on demand on ordinary plain paper, card or other carrier material. Alternatively the content and the pattern may be printed onto the product separately, for example the content may be printed onto the product which has already been printed with the position identifying pattern.

The present invention is particularly suitable to monochrome printing. However, it can also be used with colour printers, and may indeed be advantageous under some circumstances. For example, colour printers can often be set to print in grey scale, which causes them to mix the different coloured toners, such as cyan, magenta and yellow, to produce different shades of grey. When operating in this mode colour printers can advantageously be operated according to the invention. Also where a colour printer has run out of one or more ink colours it may become necessary to print the content and the position identifying pattern using the same colour, for example to print some of the content in black ink as well as the pattern. Again, in these circumstances, the present invention can usefully be used.

The density of the content elements, which may for example be measured as the total area of content elements per unit area of the image, may be greater than the density of the pattern elements, which may be measured as the total area of the pattern elements per unit area of the image. As the density of the content elements increases the visibility, to a human reader, of the content over the pattern increases, but the ease with which the pattern can be machine read by a reading device, such as a digital pen, decreases. For example, where the content is to be applied as a grey scale, the density may be measured as the grey scale of the content. This is particularly applicable to monochrome printing methods. Where colour printing or marking methods are used for the content, the density may be defined as the average reflectivity of the defined content within a particular wavelength. For example if the pattern is to be produced in some regions using a marking material having a reflectivity in a particular wavelength, then the density can be defined as the average reflectivity of the content within that range of wavelengths. Other measures of density may also be used. For example, where the content is to be applied as a grey scale, the density may be measured as the grey scale of the content. This is particularly applicable to monochrome printing methods. Where colour printing or marking methods are used for the content, the density may be defined as the average reflectivity of the defined content within a particular wavelength. For example if the pattern is to be produced in some regions using a marking material having a reflectivity in a particular wavelength, then the density can be defined as the average reflectivity of the content within that range of wavelengths.

The minimum possible contrast between the individual pattern marks and the content, which allows the reading device to detect the pattern, depends on various factors relating to the reading device, including the resolution of its imaging device and the processing methods it uses to analyse the pattern. According to a second aspect of the invention there is provided a corresponding system for generating an image.

According to a third aspect of the invention there is provided a product having a position identifying pattern and a content feature applied to it, wherein the pattern comprises a plurality of discrete pattern marks each being of at least a predetermined size, the content feature comprises content marks, the content and the pattern are superimposed on each other within at least an area of the product, said area having two dimensions, and within said area the content marks are smaller than the pattern marks in at least one of the dimensions.

According to a fourth aspect of the invention there is provided a method of analysing a position identifying pattern on a product, the product having thereon the position identifying pattern comprising a plurality of pattern elements and a content feature comprising a plurality of content elements, the content elements being smaller than the pattern elements, the method comprising the steps of forming an image of an area of the pattern and the content, and processing the image to extract the pattern from the content on the basis of the relative sizes of the pattern elements and the content elements.

A corresponding system for analysing a position on a product is also provided.

According to a further aspect of the invention there is provided a data carrier carrying data arranged to control a computer system to operate as a system according to the invention, or to carry out the methods of the invention.

The data carrier can comprise, for example, a floppy disk, a CDROM, a DVD ROM/RAM (including +RW, −RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

DESCRIPTION OF THE PREFERRED EMBODIMENTS

Figure 1:
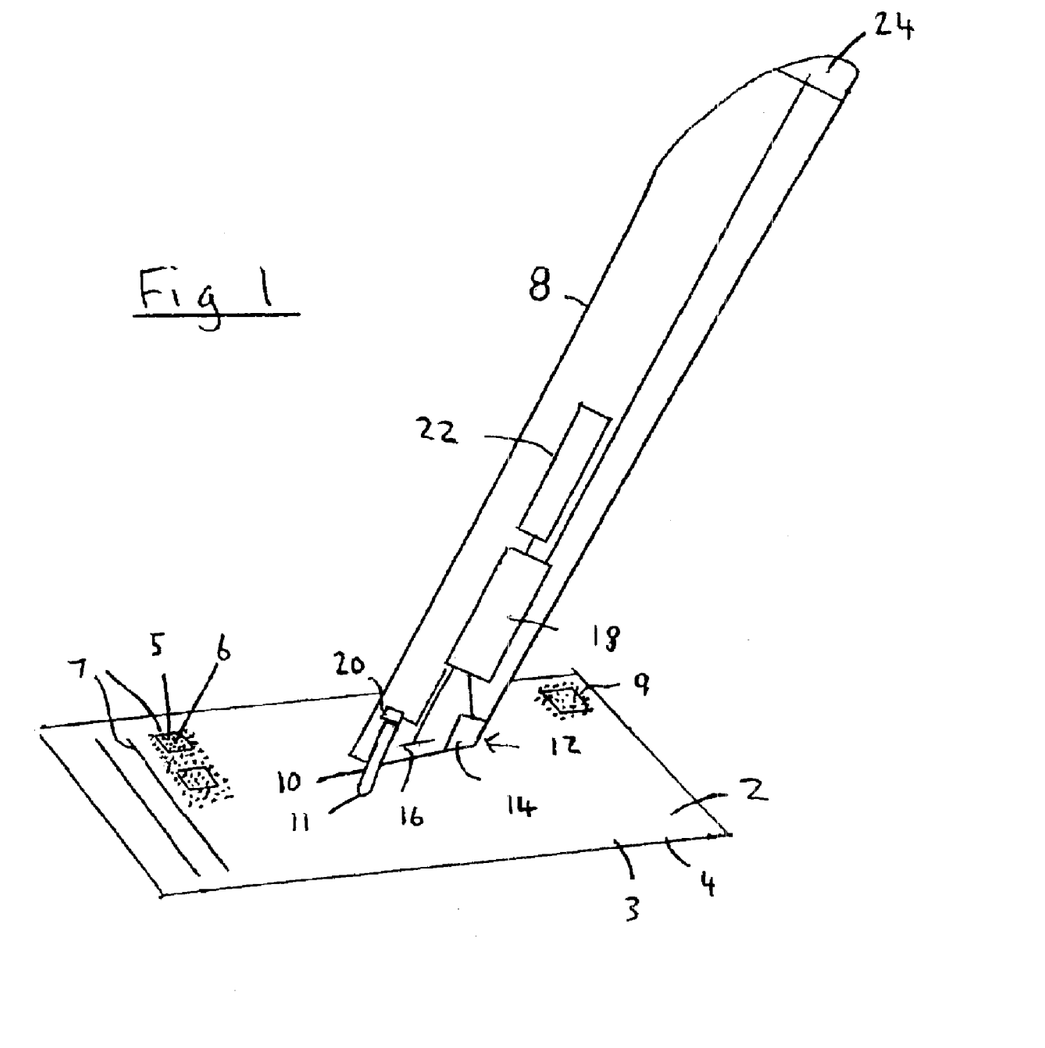
FIG. 1 shows a document according to an embodiment of the invention and a digital pen according to and embodiment of the invention.

Referring to FIG. 1, a document 2 according to an embodiment of the invention for use in a digital pen and paper system comprises a carrier 3 in the form of a single sheet of paper 4 with position identifying markings 5 printed on some parts of it. The markings 5, which are not shown to scale in FIG. 1, form a position identifying pattern 6 on the document 2. Also printed on the paper 4 are further markings 7 which are clearly visible to a human user of the document, and which make up the content of the document 2. The content 7 is in the form of a number of lines which extend over, and are therefore superimposed upon, the pattern 6.

The pen 8 comprises a writing nib 10, and a camera 12 made up of an infra red (IR) LED 14 and an IR sensor 16.

The camera 12 is arranged to image a circular area of diameter 3.3 mm adjacent to the tip 11 of the pen nib 10. A processor 18 processes images from the camera 12 taken at a specified sample rate. A pressure sensor 20 detects when the nib 10 is in contact with the document 2 and triggers operation of the camera 12. Whenever the pen is being used on an area of the document 2 having the pattern 6 on it, the processor 18 can determine from the pattern 6 the position of the nib 10 of the pen whenever it is in contact with the document 2. From this it can determine the position and shape of any marks made on the patterned areas of the document 2. This information is stored in a memory 22 in the pen as it is being used. When the user has finished marking the document 2, this is recorded in a document completion process, for example by making a mark with the pen 8 in a send box 9. The pen is arranged to recognise the pattern in the send box 9 and send the pen stoke data to a pen stroke interpretation system in a suitable manner, for example via a radio transceiver 24 which provides a Bluetooth radio link with an internet connected PC. Suitable pens are available from Logitech under the trade mark Logitech lo.

Figure 2:
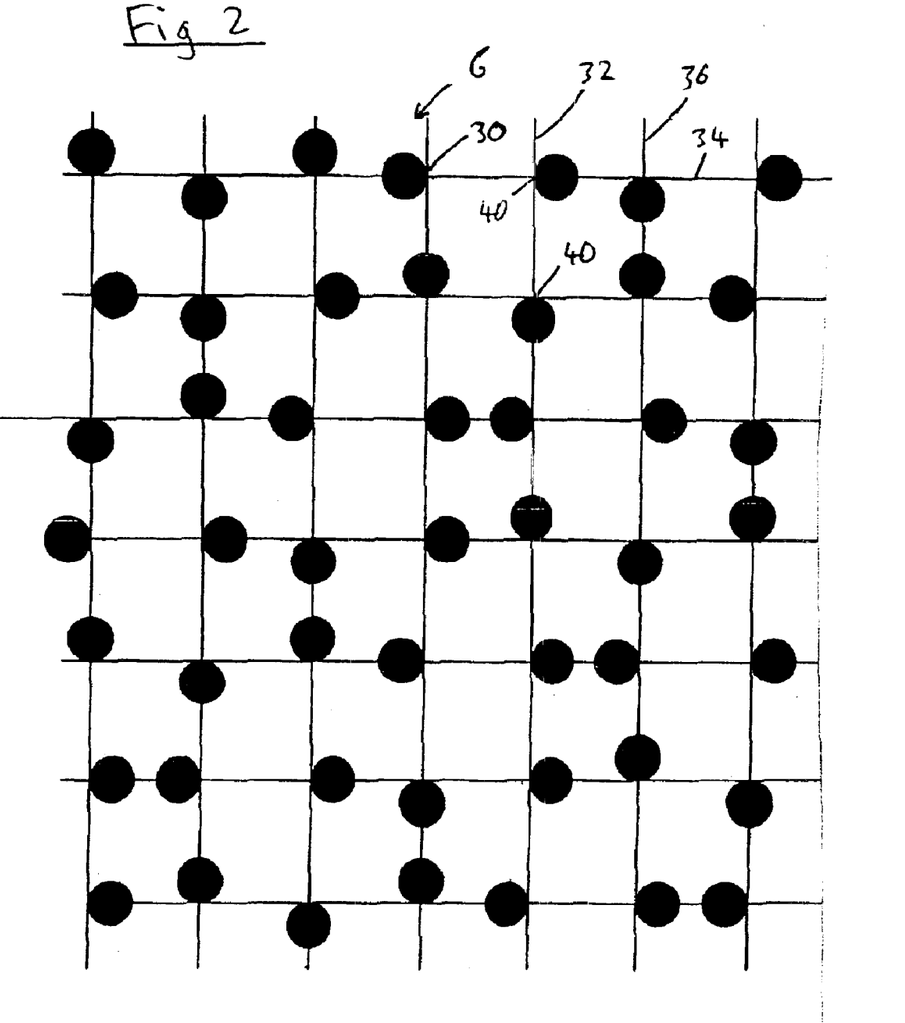
FIG. 2 shows a part of a position identifying pattern on the document of FIG. 1.

Referring to FIG. 2, the position identifying pattern 6 is made up of a number of graphical elements in the form of black ink dots 30 arranged on an imaginary grid 32. The grid 32, which is shown in FIG. 2 for clarity but is not actually marked on the document 2, can be considered as being made up of horizontal and vertical lines 34, 36 defining a number of intersections 40 where they cross. The intersections 40 are of the order of 0.3 mm apart, and the dots 30 are of the order of 100 $\mu$m across. One dot 30 is provided at each intersection 40, but offset slightly in one of four possible directions up, down, left or right, from the actual intersection 40. The dot offsets are arranged to vary in a systematic way so that any group of a sufficient number of dots 30, for example any group of 36 dots arranged in a six by six square, will be unique within a very large area of the pattern. This large area is defined as a total imaginary pattern space, and only a small part of the pattern space is taken up by the pattern on the document 2. By allocating a known area of the pattern space to the document 2, for example by means of a coordinate ordinate reference, the document and any position on the patterned parts of it can be identified from the pattern printed on it. An example of this type of pattern is described in WO 01/26033.

Figure 3:
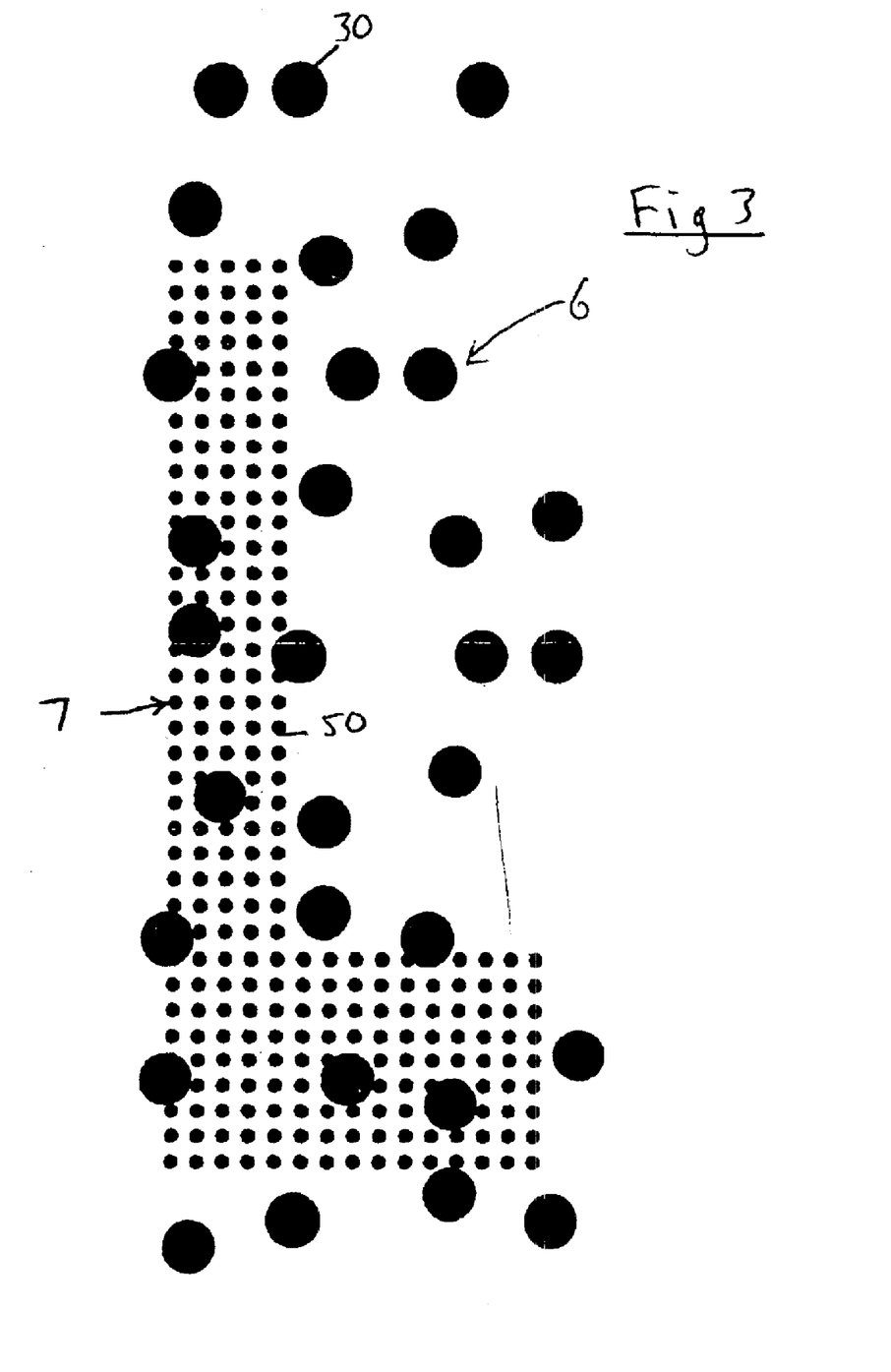
FIG. 3 shows a part of the position identifying pattern of the document of FIG. 1 with a content feature superimposed thereon.

Referring to FIG. 3, the content markings 7 are made up of a 6 regular square array of discrete, equally spaced, graphical elements, in the form of content dots 50, each of which is significantly smaller in both the horizontal and vertical dimensions, and in area, than each of the pattern dots 30. The content dots 50 are also spaced apart in both the horizontal and vertical directions. In this case the content dots 50 are each formed from a single dot or pixel of a 1200 dpi printer, and each dot is separated from the adjacent dots 50, both vertically and horizontally, by a space equivalent to the size if one single printer pixel. They therefore have a nominal diameter of 21 $\mu$m, and are spaced apart so that their centres are spaced at intervals of twice their diameter, i.e. 42 $\mu$m. If the content dots 50 were exactly circular and had a diameter of exactly 21 $\mu$m, then the content dots 50 would cover about 20% of the area to which they are applied, the spaces between them would make up the other 80%. In practice, each printer dot is arranged to be larger in diameter than the spacing between the dot centres, so as to ensure that total coverage is achieved in a black area where all of the dots are applied. Therefore the coverage produced by the content dots 50 will be higher than 20%. Assuming the pattern dots are 100 $\mu$m in diameter, they cover about 9% of the area to which they are applied. This means that, to the human eye, the content is clearly visible and distinguishable as a darker shade of grey over the position identifying pattern.

Referring back to FIG. 1, the processor 18 in the pen 8 receives a digital image of the combined pattern and content, as shown in FIG. 3, from the camera 12 and then processes the image in a known manner to identify the pattern dots 30. The processor 18 can identify the pattern dots 30 provided they are within a predetermined size range around 100 $\mu$m diameter, have at least a predetermined contrast with the background, defined as the relative level of absorption of light within a specific range of wavelengths, and are spaced apart with a grid spacing that is within a predetermined range around 300 $\mu$m. Therefore, because the content dots 50 are considerably smaller than the acceptable range of pattern dot sizes, and have a completely different spacing from the pattern dots 30, and produce a light enough grey scale to maintain sufficient contrast with the pattern dots 30, the pen can still identify the pattern dots 30 where the content 7 is superimposed on the pattern. The processor then analyses the positions of the pattern dots 30 and determines from them the position of the imaged area within the total pattern space. This process is then repeated at each sample period, so that the pen can determine the position of pen strokes made on the document 2 as they are made. This pen stroke data is stored as in the pen's memory 22 for transmission to a pen stroke interpretation device as described above.

Figure 4:
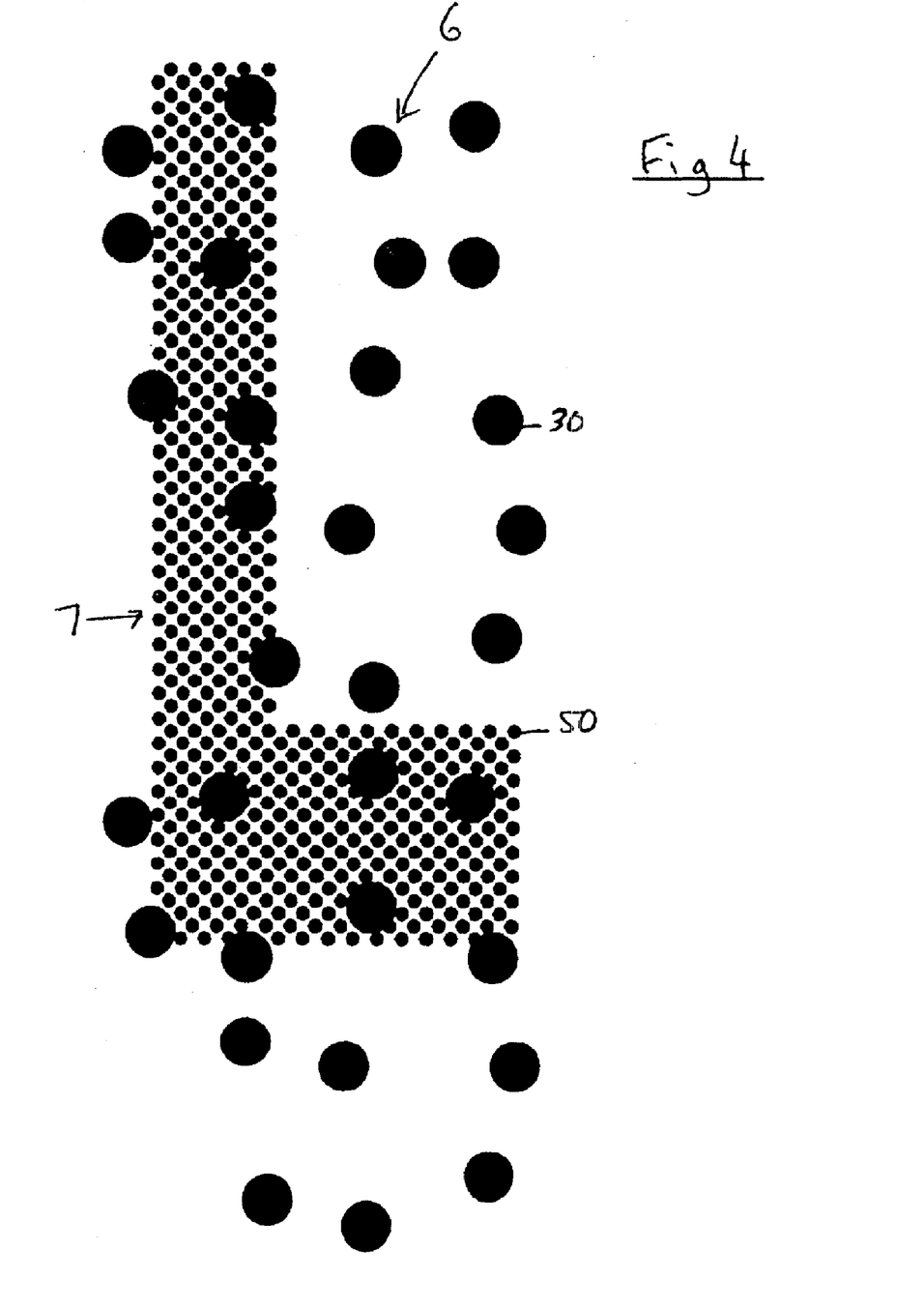
FIG. 4 shows a part of the position identifying pattern of the document of FIG. 1 with a darker content feature superimposed thereon.

The density, or grey scale, of the content dots can vary up to a certain limit, above which the pen 8 is unable to reliably read the pattern 7. Using the normal grey scale where 0 represents black and 255 represents white, a grey scale of from 255 down to about 200, which represents about 30% coverage of black ink on a white carrier, can be used with the pen 8. FIG. 4 shows an area of a document in which the pattern dots 30 and the content dots 50 are the same size as in FIG. 3, but the content dots are closer together covering about 75% of the document surface. In this case the contrast between the pattern dots 30 and the surrounding areas of content dots 50 is not sufficient for the pen 8 described above to be able to read the pattern dots.

Figure 5:
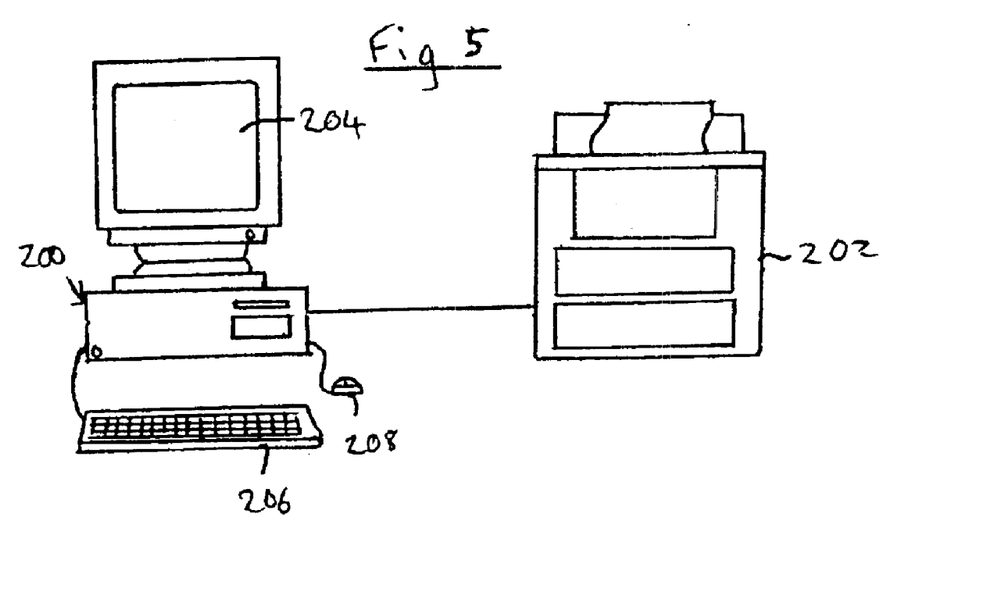
FIG. 5 shows a system, according to an embodiment of the invention, for printing the document of FIG. 1.
Figure 6:
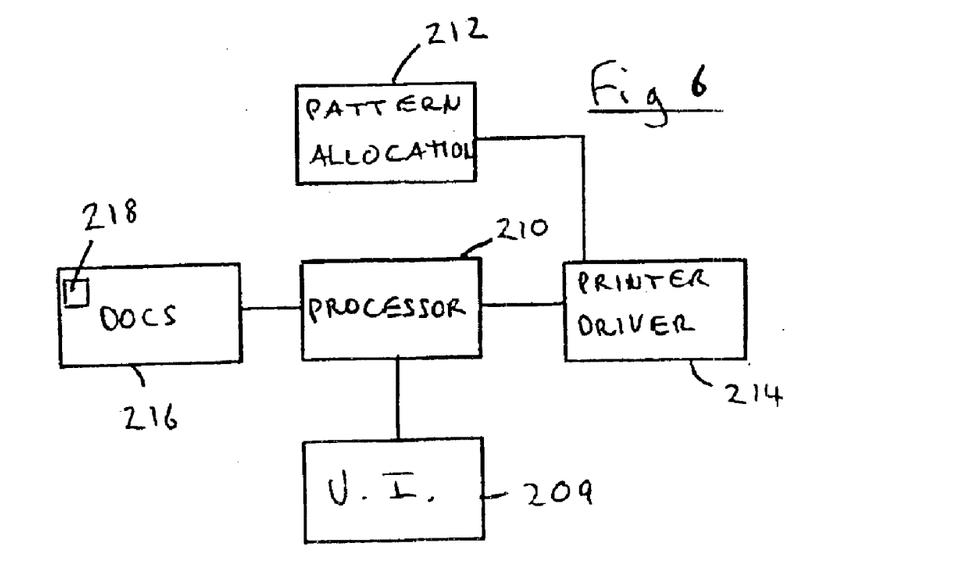
FIG. 6 shows some of the functional units within the computer of the system of FIG. 5.

Referring to FIGS. 5 and 6, a very simple system according to an embodiment of the invention for producing printed documents having the position identifying pattern on them comprises a personal computer (PC) 200 and a printer 202. The PC 200 has a screen 204, a keyboard 206 and a mouse 208 connected to it to provide a user interface 209 as shown generally in FIG. 6. As also shown in FIG. 6, the PC 200 comprises a processor 210 and a pattern allocation module 212 which is a software module stored in memory. The pattern allocation module 212 includes a definition of a total area of pattern space and a record of which parts of that total area have been allocated to specific documents, for example by means of coordinate references. The PC 200 further comprises a printer driver 214, which is a further software module, and a memory 216 having electronic documents 218 stored in it. The user interface 209 allows a user to interact with the PC 200.

The printer 202 can be any printer which has sufficient resolution to print the pattern dots 30 and the content dots 50. In this case it is a 1200 dots per inch (dpi) monochrome laser jet printer. It will be appreciated that the dimensions of the content dots 50 correspond to the dimensions of single pixel of ink from a 1200 dpi printer, and that the spacing between the content dots 50 is twice the spacing of the printer pixels. This enables the printer to print the content dots 50 as single ink dots and the pattern dots 30 as groups of ink dots, for example about 12 dots. The printer dots are not exactly circular but each comprise an irregular mark of ink on the document 2. However the exact shape of the content dots 50 is not important as the human eye cannot see their shape, and the pattern dots 30, because they are made up of a group of printer dots, are close enough to a regular shape to be read by the pen 8. Because they can be distinguished by the pen 8 by virtue of their size, the pattern dots 30 and content dots 50 can be printed using the same type of ink from the monochrome printer. Where a colour printer is used, the ink which is used for the pattern, which would typically be a black ink, can also be used for part of the content where appropriate.

In order to produce the printed document 2 the processor 210 retrieves an electronic document 218, which may be in the form of a PDF file, from the memory 216 and sends it to the printer driver together with instructions as to whether it is to be printed with pattern or not. The electronic document 218 contains a definition of the content 7, and the areas of the document 2 which can have the pattern 6 printed on it. The printer driver then determines from the instructions received whether the document is to be printed with pattern or not. If the document is to be printed without pattern on it, the content is sent for printing. If the document is to be printed with pattern on, the printer driver converts checks the nature of the content to determine whether it is already made up of graphical elements of a suitable format to enable the pattern to be read when the pattern and content are superimposed. If the content is already made up of suitable graphical content elements, then the printing process can proceed. If the content is not suitable made up, for example if it includes areas of solid black, then it is converted so that it is made up entirely of content elements 50 as described above.

When it is determined that the content is all in a suitable format, the printer driver 214 requests the required amount of pattern from the pattern allocation module 212 which allocates by means of coordinate references an area of the pattern space to the document, generates the pattern 6 for that area using a pattern generation algorithm, and communicates the details of the pattern including the positions of all the required dots, back to the printer driver 214. The printer driver 214 then combines the content 7 and the pattern 6 into a single electronic file. This file therefore forms a combined electronic definition of both the pattern and the content. The printer driver then converts the content 7 and the pattern 6 to a format, such as a postscript file, suitable for the printer 202, and sends it to the printer which prints the content 7 and the pattern 6 simultaneously in a one-pass process, i.e. on a single pass of the paper, on which the document is printed, through the printer.

In practice the various components of the system can be spread out over a local network or the internet. For example the pattern allocation module 212 can be provided on a separate internet connected server so that it can be accessed by a number of users.

While the use of a 1200 dpi printer is described above, a similar result can also be achieved with lower resolution printers, such as 600 dpi printers. For a 600 dpi printer, the approximate diameter if each ink dot is 42 $\mu$m. This is therefore still well below the minimum diameter for a dot that will be recognized by the pen 8 as a pattern dot. Therefore if the content is printed as single, spaced apart ink dots or pixels from a 600 dpi printer, and the pattern dots are printed as groups of ink dots, then the content and pattern can be printed simultaneously on a 600 dpi printer. Again the grey scale of the content dots needs to be kept at such a level that it will not interfere with the pens ability to identify the pattern dots. A maximum of about 30% grey has been found to work with the Logitec Io™ pen.

Figure 7:
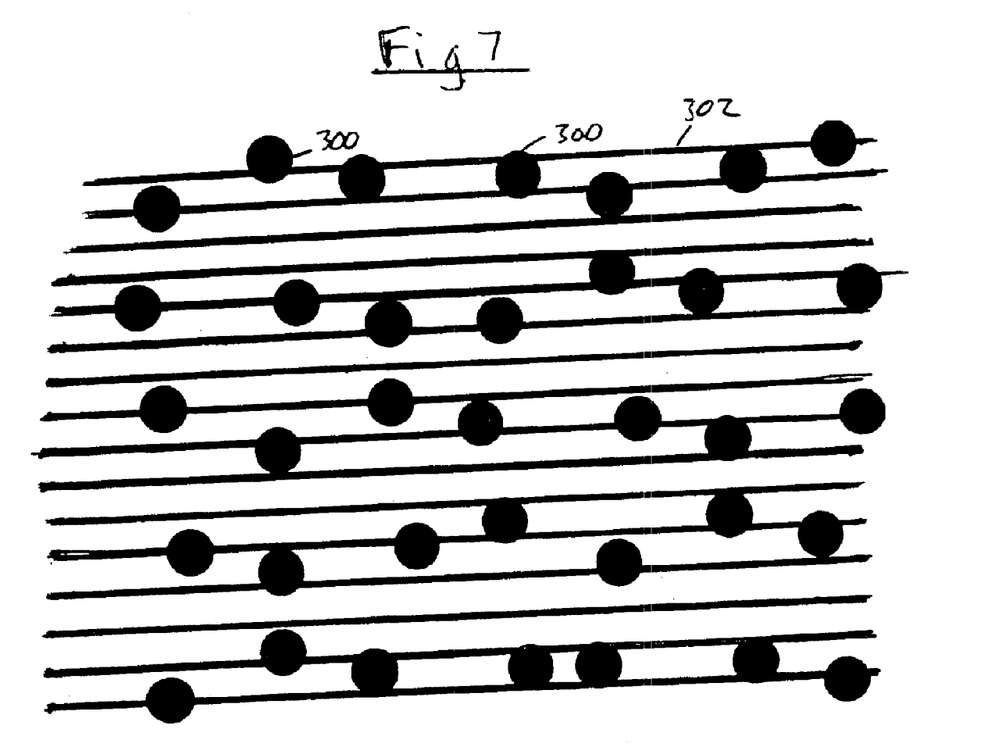
FIG. 7 shows a part of a position identifying pattern and content on a document according to a further embodiment of the invention.

If other methods of printing, such as offset printing are used, the resolution of the printed pattern and content can be much higher than with inkjet or laser jet printers. This gives greater freedom in the manner in which the content can be produced. FIG. 7 shows an example of a document in which the position identifying pattern is again provided by a set of pattern dots 300, but the content is produced as a set of lines 302, using the same ink as for the dots. The content lines 302 are much narrower than the pattern dots 300 and spaced apart by a distance equal to about four times their width. This means that they cover about 20% of the document surface. In this case the pattern dots are again about 100 $\mu$m in diameter and the content lines 302 are about 20 $\mu$m in width and spaced apart at a pitch of about 100 $\mu$m.

Figure 8:
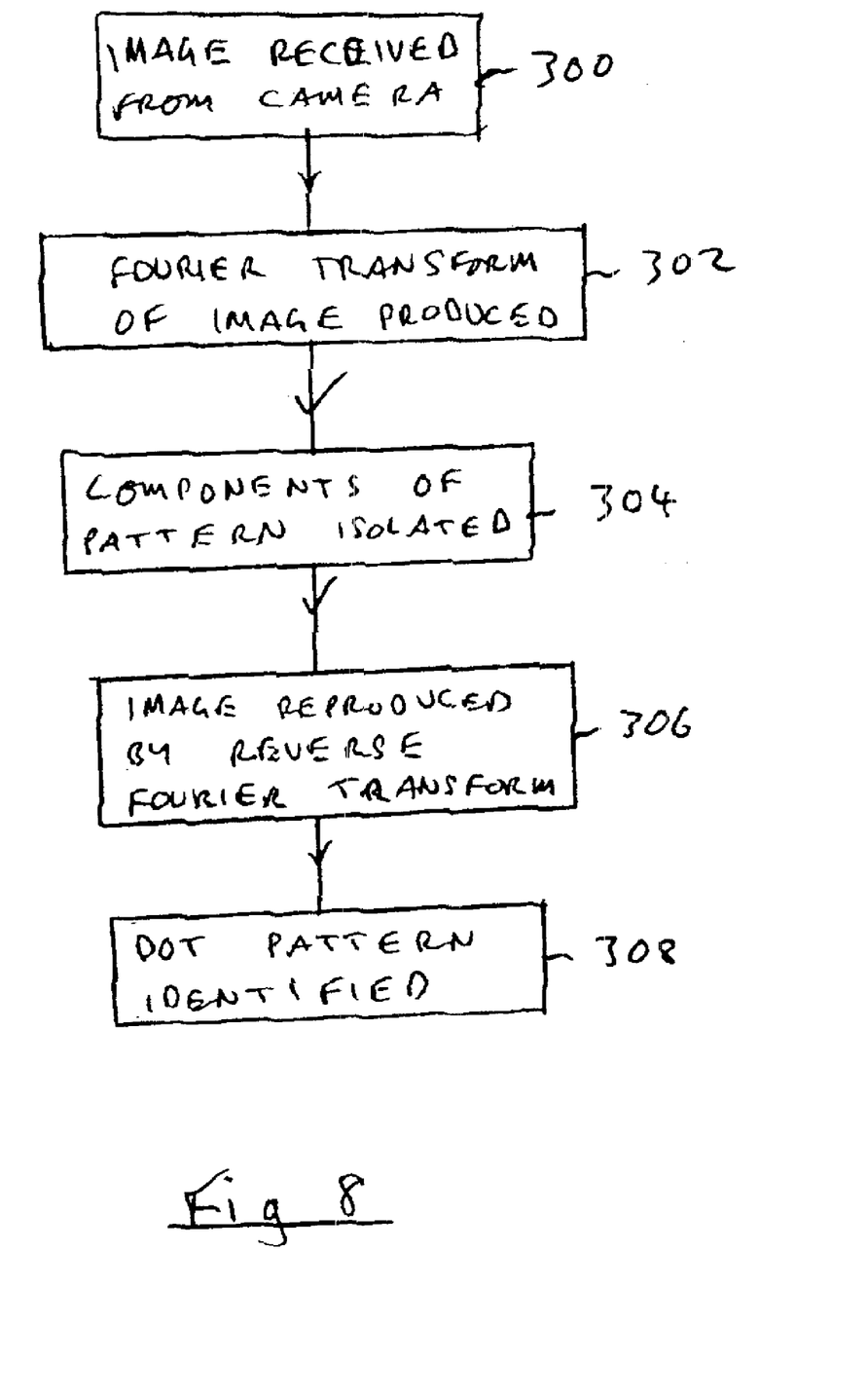
FIG. 8 shows part of a process according to an embodiment of the invention for analysing the pattern and content on the document of FIG. 1.

With the format of content and position identifying pattern described above, it is possible to use various image processing techniques within the pen processor 18 to help distinguish the content from the pattern, for a given resolution of the camera 12 in the pen 8. Because the content dots 50 are smaller than, and closer together than, the pattern dots 30, spatial filtering can be used to select, from all the marks on the document, those which make up the pattern dots 30. Spatial filtering is typically carried out using Fourier transforms, for example as described in WO 01/75783. Referring to FIG. 8, in a modification to the embodiment described above, the processor 18 is arranged to first receive, at step 300, an image of a viewed area of the document 2. Then at step 302 it performs a Fourier transform on the image which produces a map of the image in the spatial frequency domain. Next at step 304, the elements of the spatial frequency domain map which correspond to the spatial frequency of the pattern 6 are selected, and the elements which correspond to the spatial frequency of the content dots 50 are removed using a low pass filtering process. At step 306, the frequency domain map is transformed back to a new image, by reverse Fourier transform, to produce an image containing the pattern 6 but not the content 7. The modified image is then analysed by the processor 18 in the normal way to determine the position of the pattern dots 30 at step 308.

When this Fourier transform method is used, the ability of the processor 18 in the pen 8 to distinguish the pattern 6 from the content 7 is increased, so the content 7 can be made darker than that shown in FIG. 3. For example the content shown in FIG. 4 could potentially be distinguished using this method. Also the lined content of FIG. 7 can more easily be distinguished using the Fourier transform method since the content lines only have a spatial frequency in one direction, and the method of removing them is therefore simplified.

We claim:

1. A method of generating an image comprising a position identifying pattern and a content feature, the method comprising the steps of:
    generating the pattern and the content feature as a plurality of graphical pattern elements and a plurality of graphical content elements respectively, and
    superimposing the content feature and the pattern,
    wherein the content elements are smaller than the pattern elements in at least one dimension.

2. A method according to claim 1 wherein the content elements are spaced apart from each other in said one dimension.

3. A method according to claim 2 wherein the pattern and the content are each formed by the application of a marking material to a product.

4. A method according to claim 3 wherein the marking material is the same for the pattern and the content.

5. A method according to claim 4 wherein the pattern and the content are applied to the product in a one-pass process.

6. A method according to claim 5 wherein the step of generating the content feature comprises the steps of:
defining the content feature, determining whether the content feature is to be superimposed on the pattern and, if it is, converting the content feature so that it comprises said content elements.

7. A method according to claim 6 comprising, before the converting step, determining whether the content feature already comprises said content elements and, only if it does not, performing the converting step.

8. A method according to claim 4 wherein the step of generating the content feature comprises the steps of:
defining the content feature, determining whether the content feature is to be superimposed on the pattern and, if it is, converting the content feature so that it comprises said content elements.

9. A method according to claim 8 comprising, before the converting step, determining whether the content feature already comprises said content elements and, only if it does not, performing the converting step.

10. A method according to claim 3 wherein the pattern and the content are applied to the product in a one-pass process.

11. A method according to claim 10 wherein the step of generating the content feature comprises the steps of:
defining the content feature, determining whether the content feature is to be superimposed on the pattern and, if it is, converting the content feature so that it comprises said content elements.

12. A method according to claim 11 comprising, before the converting step, determining whether the content feature already comprises said content elements and, only if it does not, performing the converting step.

13. A method according to claim 2 wherein the step of generating the content feature comprises the steps of:
defining the content feature, determining whether the content feature is to be superimposed on the pattern and, if it is, converting the content feature so that it comprises said content elements.

14. A method according to claim 13 comprising, before the converting step, determining whether the content feature already comprises said content elements and, only if it does not, performing the converting step.

15. A method according to claim 1 wherein the pattern and the content are each formed by the application of a marking material to a product.

16. A method according to claim 5 wherein the marking material is the same for the pattern and the content.

17. A method according to claim 16 wherein the step of generating the content feature comprises the steps of:
defining the content feature, determining whether the content feature is to be superimposed on the pattern and, if it is, converting the content feature so that it comprises said content elements.

18. A method according to claim 17 comprising, before the converting step, determining whether the content feature already comprises said content elements and, only if it does not, performing the converting step.

19. A method according to claim 15 wherein the pattern and the content are applied to the product in a one-pass process.

20. A method according to claim 19 wherein the step of generating the content feature comprises the steps of:
defining the content feature, determining whether the content feature is to be superimposed on the pattern and, if it is, converting the content feature so that it comprises said content elements.

21. A method according to claim 20 comprising, before the converting step, determining whether the content feature already comprises said content elements and, only if it does not, performing the converting step.

22. A method according to claim 16 wherein the pattern and the content are applied to the product in a one-pass process.

23. A method according to claim 22 wherein the step of generating the content feature comprises the steps of:
defining the content feature, determining whether the content feature is to be superimposed on the pattern and, if it is, converting the content feature so that it comprises said content elements.

24. A method according to claim 23 comprising, before the converting step, determining whether the content feature already comprises said content elements and, only if it does not, performing the converting step.

25. A method according to claim 15 wherein the pattern and the content are applied to the product by a printer.

26. A method according to claim 1 wherein the step of generating the content feature comprises the steps of:
defining the content feature, determining whether the content feature is to be superimposed on the pattern and, if it is, converting the content feature so that it comprises said content elements.

27. A method according to claim 26 comprising, before the converting step, determining whether the content feature already comprises said content elements and, only if it does not, performing the converting step.

28. A method according to claim 1 wherein the content elements are smaller than the pattern elements in two dimensions.

29. A method according to claim 1 wherein the content elements are each smaller in area than each of the pattern elements.

30. A method according to claim 1 wherein the pattern elements are each formed from a plurality of pixels merged together to form a substantially solid element.

31. A method according to claim 30 wherein the density of the content elements is formed as a single one of said pixels.

32. A method according to claim 1 wherein the density of the content elements within an area of the image is greater than the density of the pattern elements within said area.

33. A method according to claim 1 wherein the elements making up the content feature are arranged in a regular array.

34. A method according to claim 33 wherein the elements in the array are equally spaced.

35. A data carrier carrying data arranged to control a computer system to perform a method according to claim 1.

36. A system for generating an image comprising a position identifying pattern and a content feature, the system being arranged to generate the content feature and the pattern, such that they are each made up of graphical elements and are superimposed on each other, and such that the elements of the content are smaller in at least one dimension than the elements of the pattern.

37. A system according to claim 36 comprising a marking device arranged to generate the image by applying marking material to a product.

38. A system according to claim 37 wherein the marking device is a printer.

39. A system according to claim 37 wherein the marking device is arranged to apply the pattern elements and the content elements using a marking material which is the same for the pattern elements and the content elements.

40. A system according to claim 37 wherein the marking device is arranged to apply the elements to the product by applying marking material to the product in a plurality of dots to produce the pattern marks and the content marks.

41. A system according to claim 40 wherein the marking device is arranged to form each of the pattern elements from a plurality of said dots.

42. A system according to claim 40 wherein the marking device is arranged to from each of the content elements from at least one of said dots.

43. A system according to claim 40 wherein the marking device is arranged to form each of the content elements from a single one of said dots.

44. A system according to claim 37 wherein the marking device is arranged to apply the pattern elements and the content elements to the product in a one-pass process.

45. A system for applying a position identifying pattern to a product, the system comprising:

marking means arranged to apply pattern marks to the product to make up a position identifying pattern and content marks to the product to make up a content feature, and control means arranged to control the marking means so as to superimpose the content and the pattern on each other within at least an area of the product, said area having two dimensions, and within said area to make the content marks smaller than the pattern marks in at least one of the dimensions.

46. A data carrier carrying data arranged to control a computer system to operate as a system according to claim 45.

47. A product having a position identifying pattern and a content feature applied to it, wherein:

the pattern comprises as a plurality of discrete pattern marks, the content feature comprises a plurality of content marks, the content and the pattern are superimposed on each other within at least an area of the product, said area having two dimensions, and within said area the content marks are smaller than the pattern marks in at least one of the dimensions.

48. A method of analysing a position identifying pattern on a product, the product having on it the position identifying pattern comprising a plurality of pattern elements, and a content feature comprising a plurality of content elements, the content elements being smaller than the pattern elements, the method comprising the steps of:

forming an image of an area of the pattern and the content, and processing the image to extract the pattern from the content on the basis of the relative sizes of the pattern elements and the content elements.

49. A method according to claim 48 wherein the pattern is extracted from the content using Fourier transforms.

50. A data carrier carrying data arranged to control an imaging system to perform a method according to claim 48.

51. A system for identifying a position identifying pattern on a product, the product having thereon the position identifying pattern comprising a plurality of pattern elements and a content feature comprising a plurality of content elements, the content elements being smaller than the pattern elements in at least one dimension, the system comprising:

a sensor arranged to form an image of an area of superimposed pattern and content, and a processor arranged to process the image to extract the pattern from the content on the basis of the relative sizes of the pattern elements and the content elements.

52. A system according to claim 51 wherein the processor is arranged to extract the pattern from the content using Fourier transforms.

53. A data carrier carrying data arranged to control a computer system to operate as a system according to claim 51.

* * * * *

UNITED STATES PATENT AND TRADEMARK OFFICE
CERTIFICATE OF CORRECTION

PATENT NO. : 6,962,450 B2  Page 1 of 1
APPLICATION NO. : 10/661000
DATED : November 8, 2005
INVENTOR(S) : Patrick Brouhon et al.

It is certified that error appears in the above-identified patent and that said Letters Patent is hereby corrected as shown below:

In column 5, line 42, delete "ordinate" before "reference".

In column 5, line 47, delete "6" before "regular".

In column 9, line 53, in Claim 16, delete "claim 5" and insert -- claim 15 --, therefor.

In column 10, line 44, in Claim 31, delete "the density" and insert -- each --, therefor.

In column 11, line 13, in Claim 42, delete "from" and insert -- form --, therefor.

In column 11, lines 34-35, in Claim 46, delete "a computer" and insert -- an imaging --, therefor.

In column 12, line 21, in Claim 50, delete "a" and insert -- the --, therefor.

Signed and Sealed this

Twentieth Day of October, 2009

David J. Kappos
*Director of the United States Patent and Trademark Office*